US011640259B2

(12) United States Patent
Alwala (10) Patent No.: US 11,640,259 B2
(45) Date of Patent: May 2, 2023

(54) USE OF SURPLUS ERASE BLOCK PAIRS IN SUPER BLOCK FORMATION

(71) Applicant: WESTERN DIGITAL TECHNOLOGIES, INC., San Jose, CA (US)

(72) Inventor: Jeevani Alwala, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/880,772

(22) Filed: May 21, 2020

(65) Prior Publication Data

US 2021/0365200 A1 Nov. 25, 2021

(51) Int. Cl.
 *G06F 3/06* (2006.01)
(52) U.S. Cl.
 CPC ............ *G06F 3/0652* (2013.01); *G06F 3/064* (2013.01); *G06F 3/0604* (2013.01); *G06F 3/0673* (2013.01); *G06F 2212/7206* (2013.01)
(58) Field of Classification Search
 CPC .. G06F 12/0253; G06F 3/0614; G06F 11/104; G06F 3/0652; G06F 3/0604; G06F 3/064; G06F 3/0673; G06F 3/0688; G06F 3/0619; G06F 2212/7206; G11C 29/883
 See application file for complete search history.

(56) References Cited

U.S. PATENT DOCUMENTS

| | | | |
|---|---|---|---|
| 7,287,118 B2 | 10/2007 | Chang et al. | |
| 8,117,381 B2 | 2/2012 | Gonzalez et al. | |
| 8,737,148 B2 | 5/2014 | Byom et al. | |
| 9,239,781 B2 | 1/2016 | Jones et al. | |
| 10,067,677 B2 | 9/2018 | Chu | |
| 2005/0144516 A1* | 6/2005 | Gonzalez | G06F 12/0246 714/6.13 |
| 2010/0228940 A1* | 9/2010 | Asnaashari | G06F 12/0246 711/170 |
| 2011/0302445 A1* | 12/2011 | Byom | G11C 29/883 714/6.1 |
| 2017/0286288 A1* | 10/2017 | Higgins | G06F 12/0246 |
| 2018/0068731 A1* | 3/2018 | Kim | G06F 3/0679 |
| 2018/0217892 A1* | 8/2018 | Syu | G06F 11/104 |
| 2018/0373438 A1 | 12/2018 | Bennett et al. | |
| 2019/0042112 A1* | 2/2019 | Gangadhar | G06F 11/3037 |
| 2019/0179698 A1* | 6/2019 | Liu | G06F 3/0614 |
| 2019/0250822 A1* | 8/2019 | Choi | G06F 3/0611 |
| 2020/0293444 A1* | 9/2020 | Jain | G06F 3/0653 |
| 2020/0310967 A1* | 10/2020 | Na | G06F 12/0253 |

* cited by examiner

*Primary Examiner* — Kalpit Parikh
(74) *Attorney, Agent, or Firm* — Arentfox Schiff LLP (57) ABSTRACT

Aspects of a storage device including at least one die and a controller are provided that allow superblock formation using surplus block pairs when bad blocks occur. After the controller forms a superblock including a first block in a first plane of the die and a second block in a second plane of the die, the controller identifies the first block as a bad block and switches the second block into a surplus state (or vice-versa). The controller then forms a new superblock from blocks in a spare pool. When the number of blocks is equal to a superblock threshold, the controller attempts to pair the surplus block with another surplus block from the opposite plane according to a die sequence. If the attempt to pair is successful, the controller adds the pair to the spare pool; otherwise, the surplus block is not added to the spare pool.

20 Claims, 7 Drawing Sheets

USE OF SURPLUS ERASE BLOCK PAIRS IN SUPER BLOCK FORMATION

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

The flash storage device may include multiple flash packages or chips, each of which includes a number of dies that communicate across multiple channels with a controller of the flash storage device. Each die in a super device may include two planes, and each plane may include multiple blocks (also referred to as erase blocks) of flash memory. The dies may be logically grouped into a super device (i.e. a logical group of dies), and a pair of blocks from each die, one from each plane, may be grouped together to form a superblock (i.e. a logical group of blocks). Multiple superblocks may be formed in a super device using different pairs of blocks across the planes of each die. Moreover, some of the blocks from each die which are not formed in a superblock may be included in a spare list or pool, while other blocks from each die that are not within the spare pool may be considered surplus blocks.

SUMMARY

One aspect of a storage device is disclosed herein. The storage device includes a die and a controller. The die comprises a first plane and a second plane, where the first plane includes a first erase block and the second plane includes a second erase block. The controller is configured to form a superblock including the first erase block and the second erase block, and to identify the first erase block as a bad block. The controller is further configured to switch the second erase block into a surplus state, to attempt to pair the second erase block with another erase block in the surplus state from the first plane, and if the attempt to pair is successful, to add the pair to a spare pool. Otherwise, if the attempt to pair is not successful, the second erase block is not added to the spare pool.

Another aspect of a storage device is disclosed herein. The storage device includes a die and a controller. The die comprises a first plane and a second plane, where the first plane includes a first erase block and the second plane includes a second erase block. The controller is configured to form a superblock including the first erase block and the second erase block, to identify the second erase block as a bad block, and to form a new superblock including erase blocks from the die in a spare pool after identifying the second erase block as the bad block. The controller is further configured to switch the first erase block into a surplus state, to attempt to pair the first erase block with another erase block in the surplus state from the second plane when a number of erase blocks in the new superblock is equal to a superblock threshold, and if the attempt to pair is successful, to add the pair to the spare pool. Otherwise, if the attempt to pair is not successful, the first erase block is not added to the spare pool.

A further aspect of a storage device is disclosed herein. The storage device includes a die, one or more additional dies, and a controller. The die comprises a first plane and a second plane, where the first plane includes a first erase block and the second plane includes a second erase block. The controller is configured to form a superblock including the first erase block and the second erase block, and to identify the second erase block as a bad block. The controller is further configured to switch the first erase block into a surplus state, to attempt to pair the first erase block with another erase block in the surplus state from the second plane according to a die sequence, and if the attempt to pair is successful, to add the pair to a spare pool. The die sequence is based on a first plane count including a first number of single plane bad blocks in the first plane, a second plane count including a second number of single plane bad blocks in the second plane, an erase block count for the die in the spare pool, and a bad block count for the die. Otherwise, if the attempt to pair is not successful, the first erase block is not added to the spare pool.

It is understood that other aspects of the storage device and method will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A controller of the storage device may form superblocks using pairs of erase blocks across different planes of multiple dies. For example, each superblock in a super device including 32 dies may include a maximum of 64 erase blocks or 32 erase block pairs, with the number of erase blocks in each superblock typically being as evenly distributed as possible. Generally, when one of the blocks in one plane of a die becomes a grown bad block (GBB) (e.g. as a result of errors caused by multiple program and erase (P/E) cycles or reads performed on the erase block over time), the other block in the other plane of that die (referred to herein as a single plane good block) may be added directly to the spare pool. The superblock which contained the GBB may also be un-formed, during which the pairs of good blocks in other dies that were previously in the superblock are also added to the spare pool, and the controller may form a new superblock using the same or different pairs of good blocks (between planes of each die) in the spare pool. Similarly, when additional GBBs occur within the new superblock (or within other superblocks in the storage device), the process described above may repeat. For example, single plane good blocks opposite the plane of the GBB may be directly added to the spare pool, the existing superblock containing the GBB may be un-formed with its pairs of good blocks added again to the spare pool, and a new superblock may be formed using the same or different pairs of good blocks in the spare pool.

Although the likelihood of successful superblock formation may initially be high due to the existence of pairs of good blocks between multiple planes of each die in the spare pool, this likelihood may reduce over time if GBBs in a die tend to occur on a single plane. For example, if GBBs frequently occur within one plane of a die, the spare pool may become full of erase blocks from the other plane of that die. In such case, the spare pool for that die may become full with only single plane good blocks from one plane, preventing that die from being used for superblock formation and possibly preventing new superblocks from even being formed later on. For example, superblocks may be formed with no less than a minimum number of blocks or superblock threshold (e.g. 56 erase blocks or 28 erase block pairs from individual dies), and therefore if such single plane GBBs occur within multiple dies that similarly prevent those dies from being used for superblock formation, the spare pool may include an insufficient number of pairs of erase blocks for forming new superblocks.

Moreover, the spare pool may be limited to a maximum number of erase blocks for each plane of each die (e.g. 14 per plane, or 28 per die). Therefore, if the spare pool for a die is filled with single plane good blocks from only one plane of that die as described above, only a small amount (if any) of erase blocks that were previously in the superblock may be added to the spare pool for that die when the superblock is un-formed in response to a GBB in any die. In contrast, the remaining erase blocks in the superblock that are not added to the spare pool become surplus blocks, which typically remain unused for superblock formation (e.g. since surplus blocks are generally not added to a list that may be readily accessed like spare blocks, and identifying such surplus blocks may incur firmware overhead). In such approach where the surplus blocks are not used to form new superblocks, the usable capacity or size of the storage device may effectively be reduced, impacting storage device performance. For example, after a superblock is un-formed as described above, if the number of erase blocks in the spare pool that are available for superblock formation is reduced below the superblock threshold (e.g. 56 erase blocks), these insufficient erase blocks may remain unused in the spare pool, causing the available physical capacity of the storage device to decrease. To make use of the available spare erase blocks for superblock formation, the storage device described in the present disclosure may add pairs of surplus erase blocks to the spare pool, as described below.

For instance, to improve performance, the storage device described in the present disclosure allows the controller to form pairs of erase blocks from the surplus blocks when the controller forms a new superblock in response to one or more GBBs. The controller may form pairs from the surplus blocks when the number of erase blocks in the newly formed superblock is equal to the superblock threshold (e.g. 56 erase blocks). When the controller detects a GBB (e.g. in response to an error or an age of the block), the controller may change the single plane good block opposite the plane of the GBB into a surplus block rather than adding the single plane good block to the spare pool. For instance, each block may include a header or metadata indicating whether the block is in a surplus state, and the controller may switch the block to a surplus block by changing the header or metadata to indicate the surplus state. The controller may also maintain a count of bad blocks for each plane of each die, a count of erase blocks in the spare pool for each die, and a count of bad blocks for each die. Based on these counts, the controller may determine a die sequence indicating the order of dies in which the controller may search for erase blocks in the surplus state (e.g. by scanning the header of each block). After the controller completes its search, if the controller identifies surplus erase blocks from both planes of a die, the controller pairs the surplus blocks together and adds the pair(s) to the spare pool or list for use in the superblock formation. Thus, only paired erase blocks from the surplus state may be added to the spare pool, thereby allowing superblock formation to continue to occur even after numerous GBBs, and causing storage device capacity and life (e.g. storage space at an end of life of the storage device) to be improved through reuse of the surplus blocks for superblock formation. Moreover, as surplus blocks are added to the spare pool, the physical capacity of the storage device and the capacity of the spare pool may increase, and any logical space of the storage device that was previously reduced due to bad blocks may similarly increase.

Figure 1:
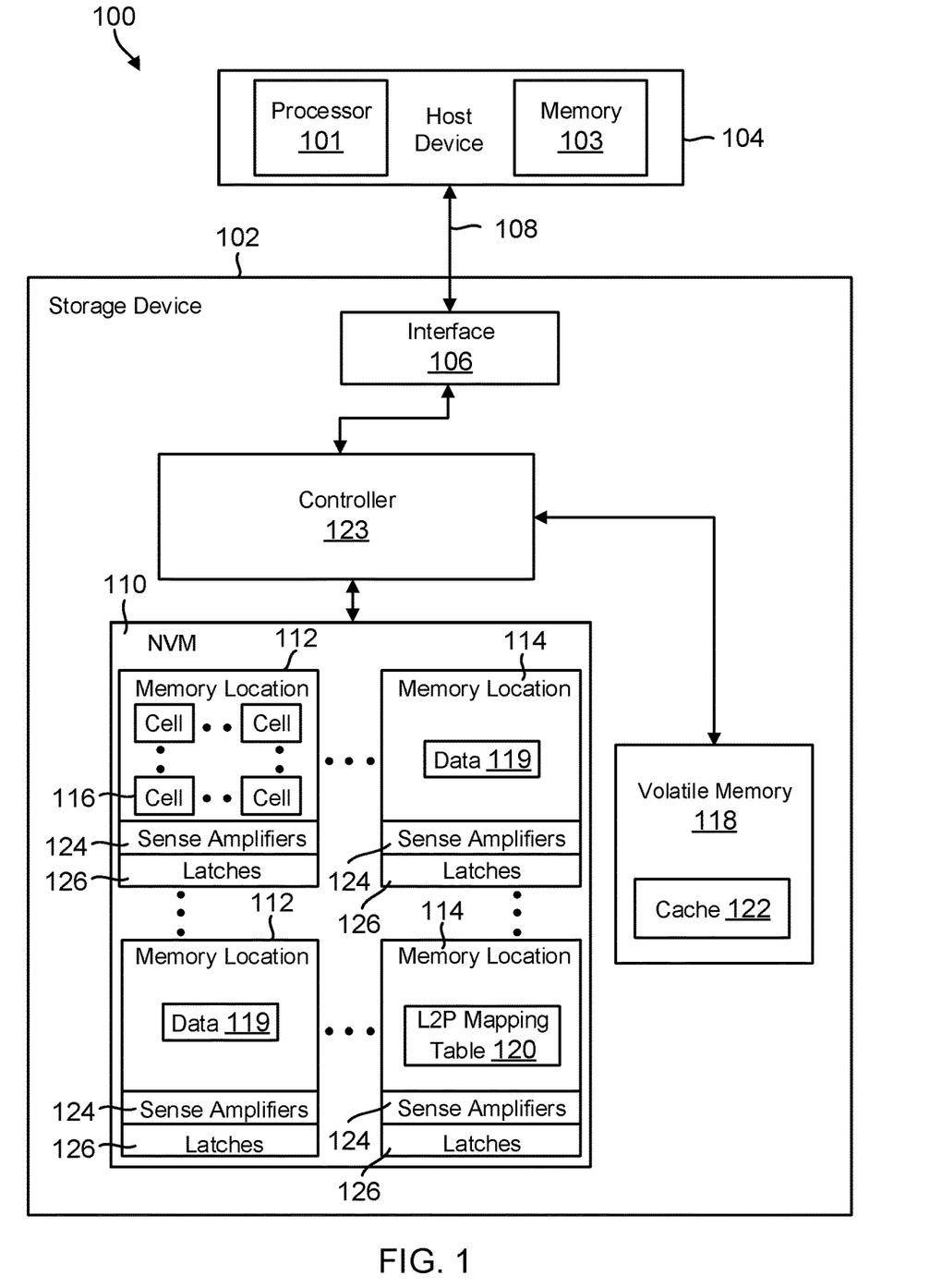
FIG. 1 is a block diagram illustrating an exemplary embodiment of a storage device in communication with a host device.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be single-level cells, multi-level cells, triple-level cells, quad-level cells, and/or penta-level cells, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
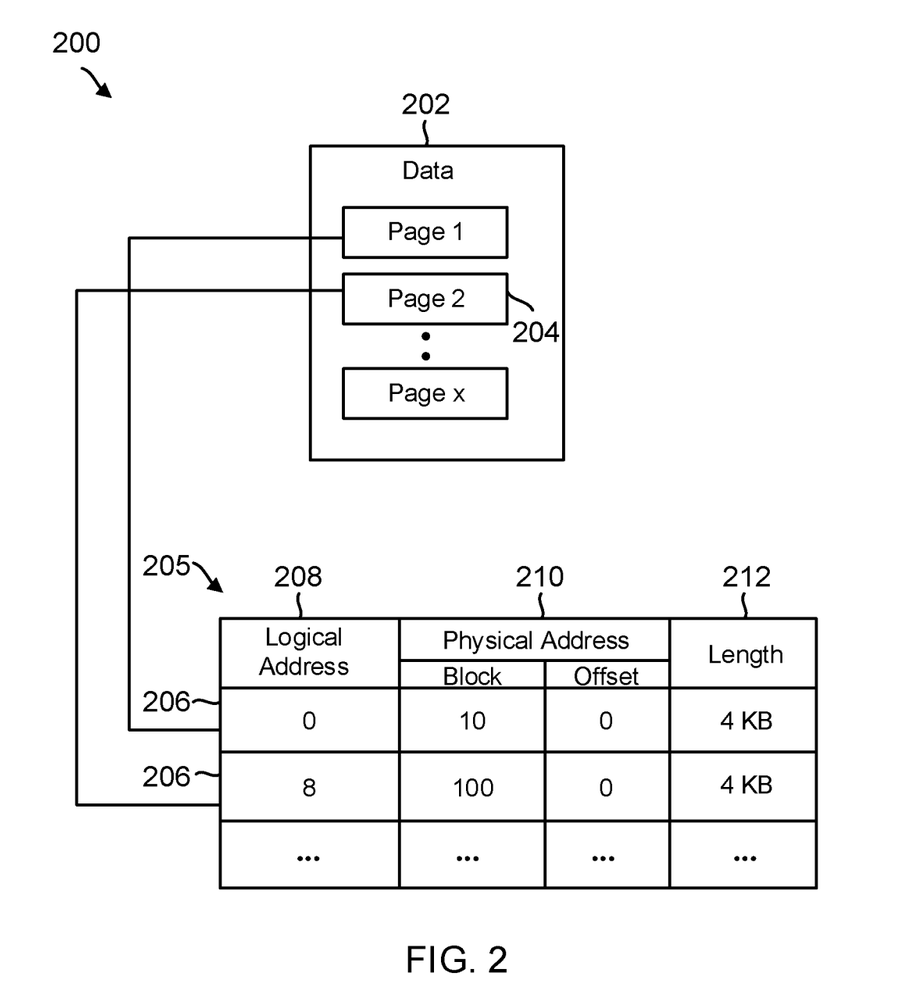
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
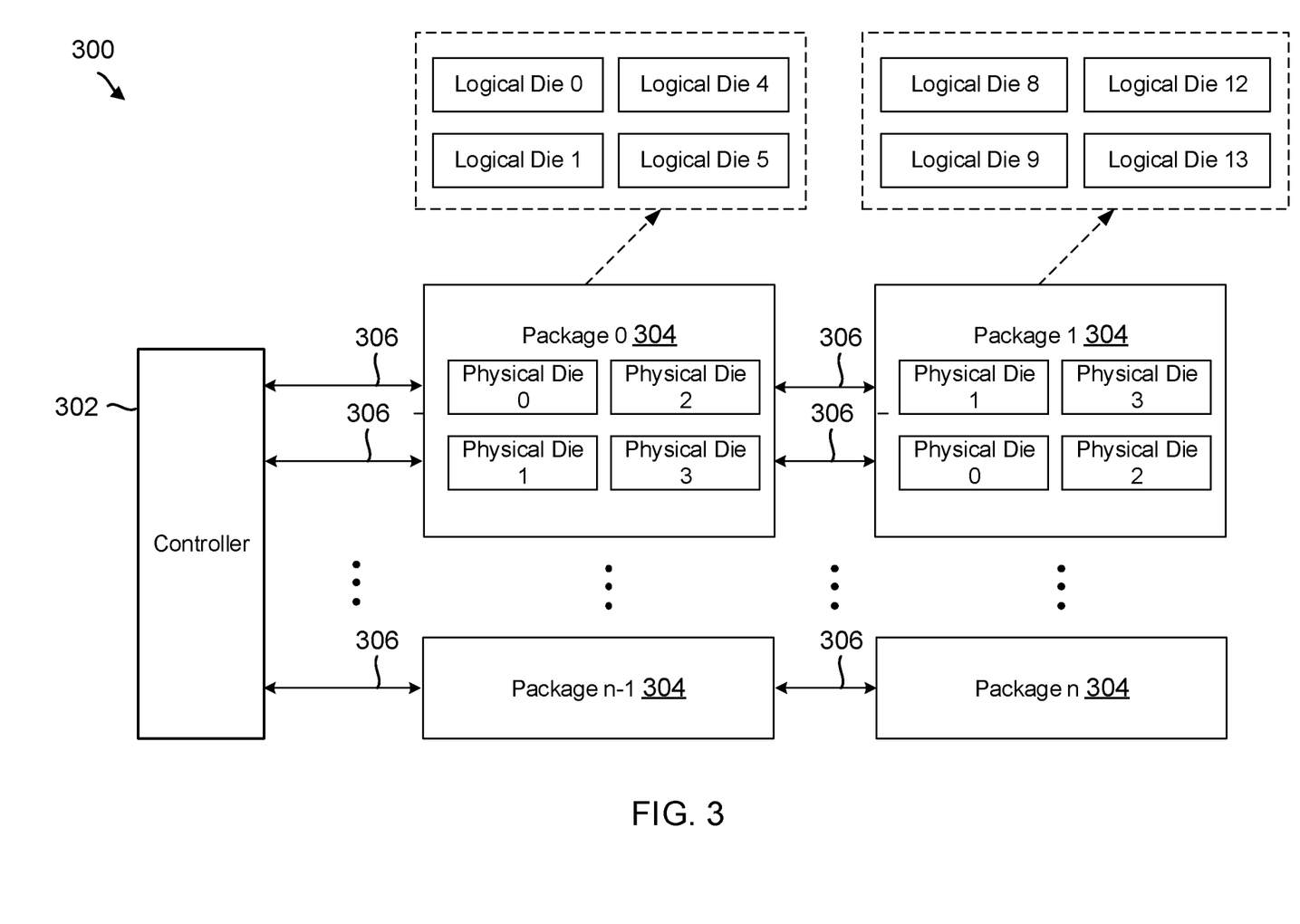
FIG. 3 is a conceptual diagram illustrating an example of multiple packages of dies in communication with a controller in the storage device of FIG. 1.

FIG. 3 illustrates an example diagram 300 of a controller 302 in communication with multiple dies arranged in flash packages 304 (e.g. chips) over multiple channels 306. The controller 302 may correspond to controller 123 of FIG. 1, and each die in packages 304 may include a memory corresponding to one of the memory locations 112 of FIG. 1. Each flash package 304 may include a number of dies identified by the package. For example, FIG. 3 illustrates each package 304 including 4 dies physically identified by the package with identifiers 0, 1, 2, and 3. Each die in a flash package may be arranged differently in each package to communicate with the controller over different channels. For example, as illustrated in FIG. 3, physical dies 0 and 2 of package 0 and physical dies 1 and 3 of package 1 may communicate with the controller on a first channel of the channels 306, while physical dies 1 and 3 of package 0 and physical dies 0 and 2 of package 1 may communicate with the controller on a second channel of the channels 306. Each die may also be associated with a logical identifier that depends upon a number of packages in the storage device and which may be arranged in a channel-package order (e.g. vertical then horizontal as in the example of FIG. 3). For instance, where the storage device includes four 4-die packages (i.e. n=3 in the example of FIG. 3), the dies may be logically identified such that package 0 includes logical dies 0, 1, 4 and 5, package n−1 (i.e. 2) includes logical dies 2, 3, 6, 7 (not shown), package 1 includes logical dies 8, 9, 12 and 13, and package n (i.e. 3) includes logical dies 10, 11, 14, and 15. This is merely one example; any number of packages or dies per package may be used, and the dies may be identified with different logical identifiers accordingly. A groups of logical dies may be formed into a super device, as described below with respect to FIG. 4.

Figure 4:
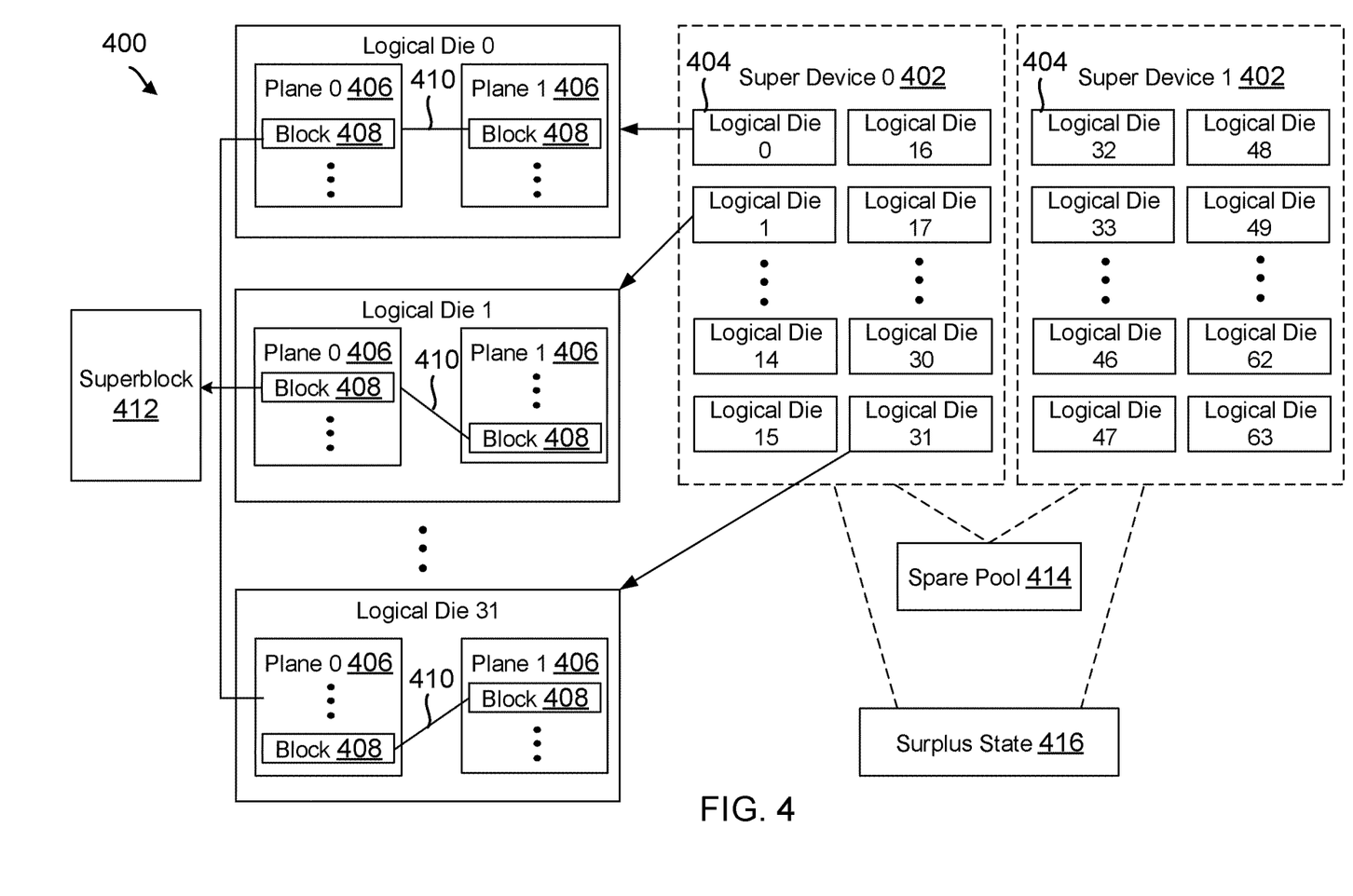
FIG. 4 is a conceptual diagram illustrating an example of a superblock formed from blocks across planes of multiple dies within a super device in the storage device of FIG. 1.

FIG. 4 illustrates an example diagram 400 of super devices 402 including multiple logical dies 404. The logical dies 404 may correspond to the logical dies in FIG. 3. Each super device 402 may include a fixed number of logical dies 404 (e.g. 32 dies or another number). For example, assuming the storage device includes eight 4-die packages (i.e. n=7 in the example of FIG. 3), and assuming the dies are logically identified in a channel-package order (e.g. based on sixteen channels), 64 logical dies (i.e. logical dies 0-63) may be identified as illustrated in FIG. 4, with one group of logical dies 0-31 forming one super device and another group of logical dies 32-63 forming another super device. The controller (e.g. controller 123, 302) may group logical dies into super devices in the example amount and arrangement illustrated in FIG. 4, or in other amounts (other than 64 dies) and arrangements (other than the illustrated channel-package order).

Each logical die 404 may include multiple planes 406 (i.e. two planes), and each plane 406 may include a group of erase blocks 408 (also referred to as simply blocks). Each erase block 408 may correspond to one of the memory locations 112 of FIG. 1. Each plane 406 may include a number of erase blocks 408 (e.g. 1000 erase blocks or another number). During (and after) initialization of the storage device, the controller (e.g. controller 123, 302) may group a pair of erase blocks between planes in each die into a superblock 412. That is, each superblock 412 may include a logical grouping of different pairs 410 of erase blocks 408 across the planes 406 of each die 404 in a super device 402. For example, the controller may logically group one pair 410 of erase blocks in logical die 0 (i.e. one erase block 408 in plane 0 and another erase block 408 in plane 1), another pair 410 of erase blocks in logical die 1 (i.e. one in plane 0 and another in plane 1), and similar pairs 410 of erase blocks in logical dies 2-31 (e.g. all 32 logical dies in the super device 402) into a single superblock 412, as illustrated in the example of FIG. 4. While FIG. 4 illustrates a specific example of pairs 410 for each die (i.e. horizontal for logical die 0, and diagonal for logical dies 1 and 31), any erase block 408 in one plane 406 of a die 404 may be paired with any erase block 408 in the other plane 406 of that die 404. Thus, where a number of dies N (e.g. 32 dies) exist in each super device, the controller may form a single superblock using 2N erase block pairs (e.g. 64 pairs) from N dies (one pair from each die, across planes). Moreover, multiple superblocks may be formed from a super device based on the number of erase blocks in each plane. For example, if both planes 406 of each logical die 404 include 10 erase blocks that may be allocated to superblocks, the controller may form ten different superblocks 412 in the super device, with each superblock including one of the ten pairs 410 of erase blocks from each die. The controller may group erase blocks into any of the superblocks by changing metadata of each erase block into an allocated state for a respective superblock, or in some other manner.

When the controller 123, 302 groups erase blocks 408 of logical dies 404 into multiple superblocks 412, the controller may attempt to evenly size the superblocks between a minimum (e.g. 56 erase blocks or another number, corresponding to the superblock threshold) and a maximum (e.g. 64 erase blocks or 32 erase block pairs, corresponding to the number of dies N). During initialization of the storage device, the controller may form superblocks with the maximum number of erase blocks (e.g. 32 pairs). However, after initialization of the storage device, bad blocks may be detected in the superblock. For example, the controller may detect that one of the erase blocks 408 has become a GBB in response to an identified error in reading or writing data to the block. GBBs may occur after multiple P/E cycles and reads, which may result in errors in read or written data on the block. If a bad block is identified in any of the superblocks 412, the controller may un-form those superblocks 412 which contained the bad blocks (e.g. by changing the metadata of each good erase block into an unallocated state for a respective superblock), and the controller may form new superblocks without the bad blocks (e.g. by changing the metadata of the good erase blocks into an allocated state for the new superblock). However, due to the existence of the bad blocks, the number of erase blocks that may be formed into the new superblock(s) may be less than the maximum number (i.e. the new superblocks are partially populated), and so the controller may attempt to create as many partially populated superblocks as possible which are evenly distributed with respect to each other. An example of this even sizing or distribution with the presence of bad blocks is shown below with respect to FIG. 5.

Figure 5:
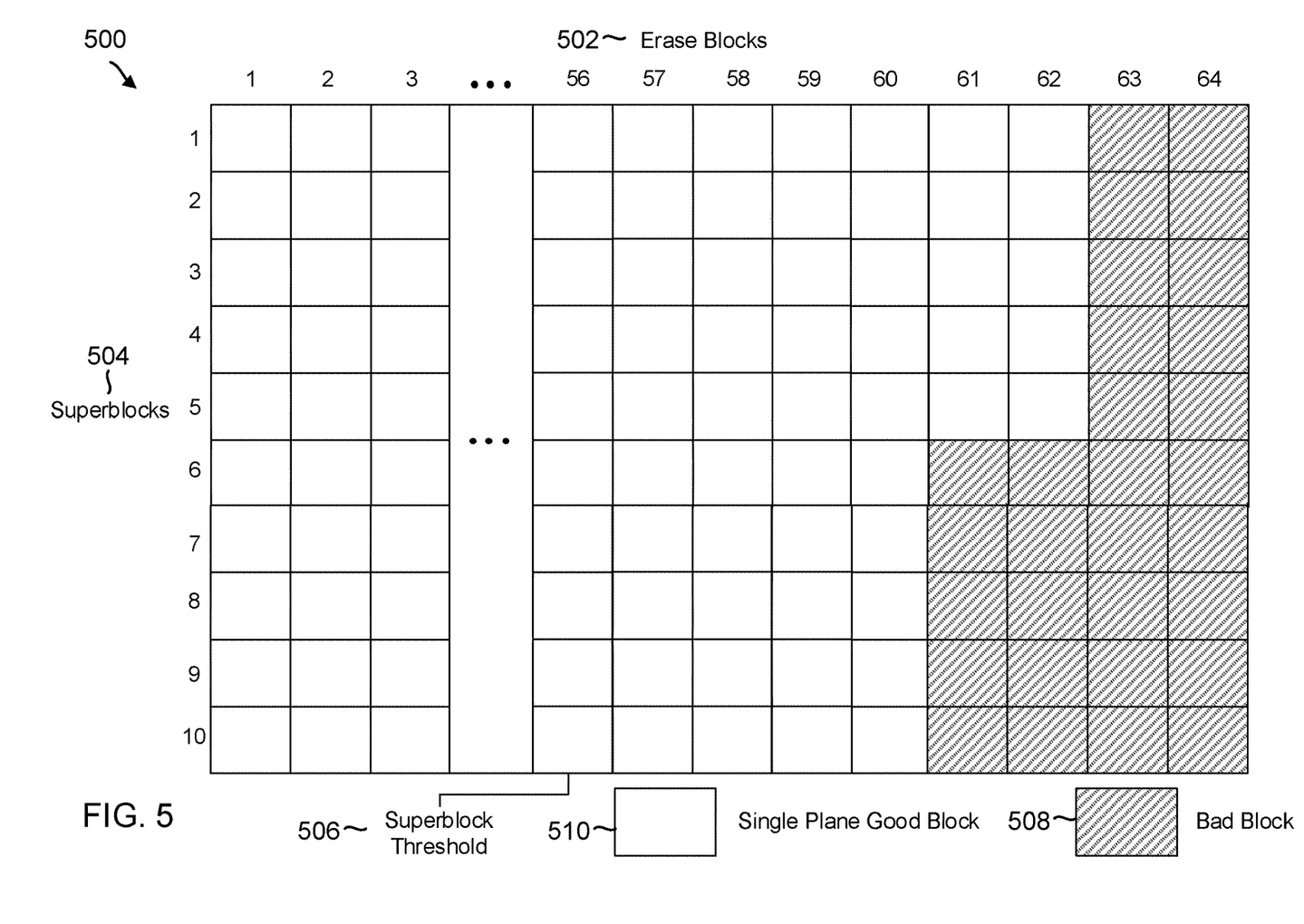
FIG. 5 is conceptual diagram illustrating an example of bad blocks distributed between various superblocks in the storage device of FIG. 1.

FIG. 5 illustrates an example diagram 500 of a distribution of erase blocks 502 in different superblocks 504. The erase blocks 502 may correspond to erase blocks 408 of FIG. 4, and the superblocks 504 may correspond to different superblocks 412 of FIG. 4. In the example of FIG. 5, the number of formable superblocks is ten (i.e. there are ten erase blocks in each plane 406 of each die 404 in FIG. 4 that may be allocated to a superblock), and the maximum number of erase blocks 502 in each superblock 504 is 64 (i.e. one for each plane of the 32 dies in the super device 402 of FIG. 4). Moreover, the minimum number of erase blocks in each superblock, or a superblock threshold 506, is 56 in this example.

In this example, the controller has detected 30 bad blocks or GBBs 508 in three dies of the super device (i.e. ten bad blocks in each die), with the other erase blocks remaining as single plane good blocks 510. Although in one approach, the controller may form the superblocks such that some superblocks include the maximum number of single plane good blocks 510, such uneven approach may result in the other superblocks having a low erase block count margin above the superblock threshold. For example, if 5 superblocks with 64 single plane good blocks and 5 superblocks with 58 single plane good blocks are formed, the latter 5 superblocks only have a erase block count margin of 2 above the superblock threshold, and thus these superblocks may be at risk of being unformed in a short period of time without re-forming capability in response to multiple GBBs being detected in these superblocks. To resolve this problem, the controller may form the superblocks as evenly as possible, for example as illustrated in FIG. 5, where 5 superblocks may be formed with 62 single plane good blocks (31 pairs) and 5 superblocks may be formed with 60 single plane good blocks (30 pairs). This approach allows the latter 5 superblocks to have a higher erase block count margin than the prior approach (i.e. a margin of 4 versus 2), maximizing the number of formable superblocks and resulting in a higher likelihood of maintaining the re-forming capability of the superblocks over a longer period of time.

Referring back to FIG. 4, erase blocks 408 which are not part of the superblocks 412, 504 may be within a spare pool 414. For instance, the controller may assign erase blocks 408 to the spare pool 414 by changing metadata for each erase block to an unallocated state with respect to the superblocks, or in some other manner. The controller may allocate erase blocks in the spare pool 414 for the formation of new superblocks in response to GBBs. For instance, if a GBB 508 is detected in one of the pairs 410 of erase blocks for a die 404, then in one example approach, the single plane good block 510 which was opposite the GBB (in the other plane for that pair 410) may be allocated to the spare pool 414. The controller may also un-form the superblock that contained the GBB by assigning other pairs of good blocks in the superblock to the spare pool 414.

Each erase block 408 may be associated with metadata, such as a header, which indicates a state of that erase block. For example, the metadata or header of certain erase blocks 408 may indicate that those erase blocks are in a surplus state 416, which represents those erase blocks which are not within the superblocks 412, 504 and not within the spare pool 414. Other states that may be identified from the metadata or header of each erase block may include, for example, an assigned not full state (e.g. open or partially open erase blocks in a superblock that may store host data), an assigned full state (e.g. closed erase blocks in a superblock that may not store host data until erased), an unassigned not full state (e.g. open or partially open erase blocks in the spare pool 414), an unassigned full state (e.g. closed erase blocks in the spare pool 414), a reserved state (e.g. erase blocks reserved for other purposes), and a bad block state (e.g. GBBs). The metadata of each block may be stored, for example, as data in the NVM 110.

The number of erase blocks 408 which may be allocated to the spare pool 414 (e.g. in the unallocated not full or unallocated full state) may be limited for each plane 406 and for each die 404. For example, the controller may allocate a maximum of 14 erase blocks in each plane 406 of a die 404, or 28 erase blocks in each die 404, to the spare pool 414. Accordingly, when superblocks are un-formed as described above due to bad blocks, the controller may assign the erase blocks 408 that were previously in the superblocks to the spare pool 414 while not exceeding the maximum number of spare erase blocks for each plane 406 and die 404. For instance, the controller may assign pairs of good erase blocks for each die to the spare pool so long as the spare pool contains no more than 14 good blocks per plane 406 or 28 good blocks per die 404. Otherwise, if these limits would be exceeded (i.e. the spare pool is full), then the controller may switch the erase blocks that were in the superblock to the surplus state 416.

However, when the controller allocates erase blocks 408 or single plane good blocks 510 to the spare pool 414 in response to un-forming of the superblock 412, 504 as described above, the controller may add these blocks to the spare pool regardless of the plane 406 in which these erase blocks reside (e.g. to save firmware overhead in determining the plane in which each block resides). Therefore, if GBBs 508 occur only within one of the two planes, the spare pool 414 may become full with single plane good blocks residing only within the other of the two planes. As a result, there may be insufficient pairs 410 of single plane good blocks 510 in the spare pool 414 for superblock formation, increasing the likelihood that new superblocks may not be formed after existing superblocks are un-formed. To address this problem, when a GBB 508 is detected, the controller may switch the single plane good block 510 (opposite the GBB 508) to the surplus state 416, rather than allocating the block to the spare pool 414. As a result, the probability of the spare pool 414 being occupied with single plane good blocks 510 from only one plane 406 is reduced, and the likelihood that new superblocks may be formed due to the existence of pairs 410 in the spare pool 414 may consequently increase.

Moreover, as opposed to leaving the surplus blocks unused for superblock formation, the controller may identify pairs 410 of erase blocks 408 in the surplus state 416 when forming superblocks 412, 504. For example, once a previous superblock is un-formed due to GBBs and the controller forms a new superblock using pairs 410 in the spare pool 414, if the controller determines that the number of erase blocks in the newly formed superblock is equal to the superblock threshold 506, the controller may scan each erase block 408 in each die to identify pairs 410 of blocks in the surplus state 416 to add to the spare pool 414. For example, the controller may read the metadata or header of each erase block from the NVM 110, identify blocks in the surplus state 416 in each plane 406 from the metadata, and then pair the identified blocks in one plane with identified blocks in the other plane. The controller may scan the erase blocks in each die according to a die sequence, the determination of which is described below with respect to FIG. 6. After identifying the pairs 410 of surplus blocks in all of the dies 404 of the super device 402, the controller may allocate the pairs to the spare pool 414. The controller may then add pairs from the spare pool to existing superblocks or to create new superblocks.

The storage device may identify the die sequence to scan for surplus block pairs using various flags and counters. For example, the controller may maintain separate counters of the number of bad blocks which have occurred for each plane of each die, (or the number of single plane good blocks which exist for each plane of each die). The controller may also store a scan mode flag (e.g. scan_mode or another name) which may include one of multiple states: disabled, start, in progress, and stop. The "disabled" state may be the default or initial state of the scan mode flag which is set upon initialization of the storage device (e.g. after a power cycle), and indicates that surplus block scanning is currently disabled. The controller may change the scan mode flag to the "start" state when the controller begins forming the die sequence, e.g. in response to detecting that a number of erase blocks in a superblock is equal to the superblock threshold. The controller may change the scan mode flag to the "in progress" state when the controller completes forming the die sequence and begins scanning the erase blocks according to the die sequence to form pairs of blocks in the surplus state. The controller may change the scan mode flag to the "stop" state when the controller completes scanning the erase blocks according to the die sequence and forming surplus block pairs. Alternatively, the controller may change the scan mode flag to the "stop" state without performing erase block scanning when the controller determines while forming the die sequence that no surplus block pairs exist (e.g. GBBs only occurred for one plane of each die, or stated another way, single plane good blocks only exist for one plane of each die).

Figure 6:
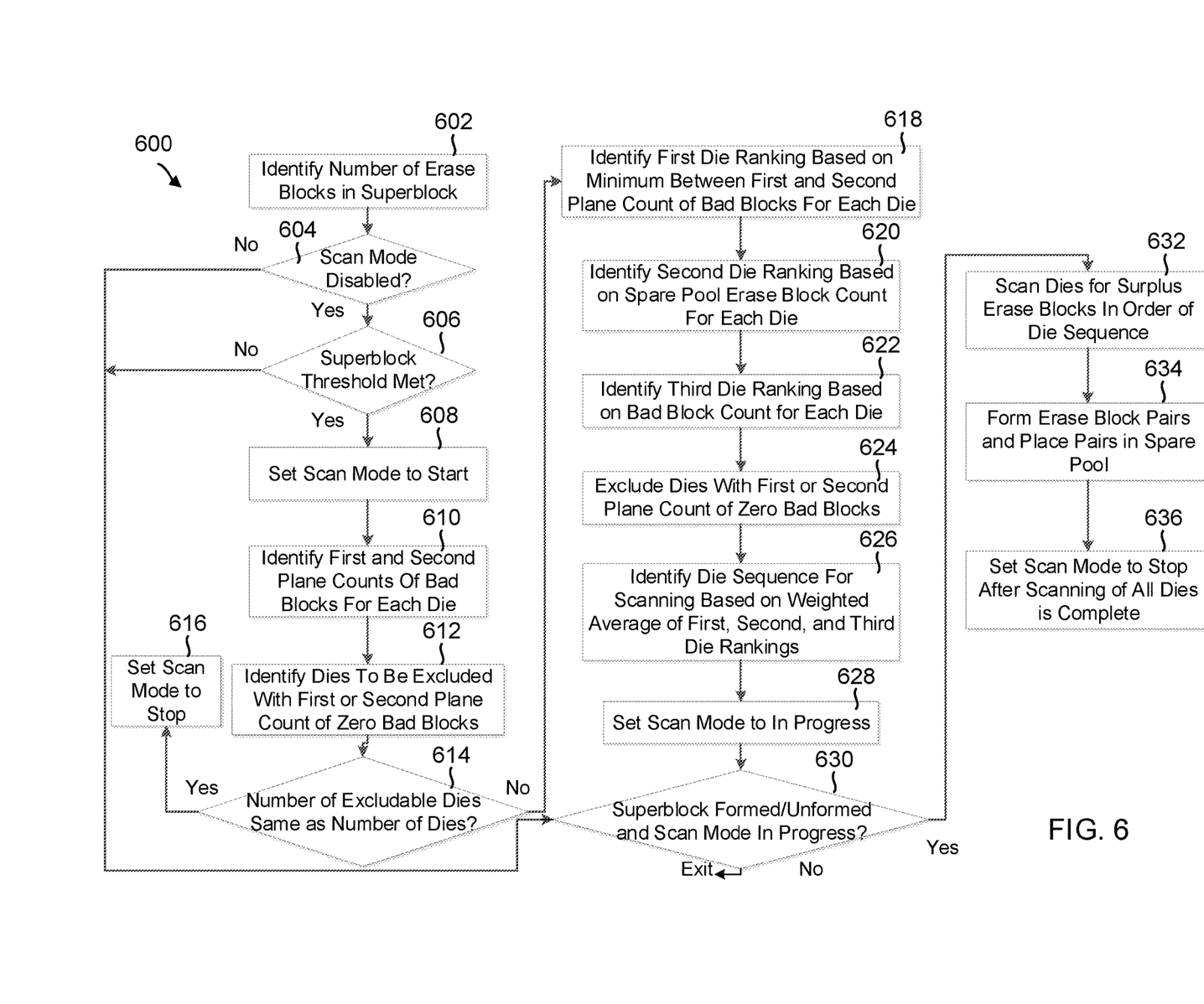
FIG. 6 is a flow chart illustrating a method for identifying a die sequence for pairing surplus blocks to form a superblock, which is performed by the storage device of FIG. 1.

FIG. 6 illustrates an example flow chart 600 of a method for identifying a die sequence for pairing surplus blocks to form a superblock. For example, the method can be carried out in a storage device 102 such as the one illustrated in FIG. 1. Each of the steps in the flow chart can be controlled using the controller as described below (e.g. controller 123, 302), or by some other suitable means.

In one example of operation, the scan mode may initially be set to "disabled". During this time, the controller may identify a GBB in a die of a superblock (e.g. due to an detected error associated with the block in a read or write operation). When the GBB is identified only from a single plane erase block (i.e. the other block paired with the GBB in the opposite plane is good), the controller may update a number of bad blocks for the corresponding plane of that die. For instance, if the GBB is in the first plane of a die (e.g. plane 0) while the paired block in the second plane of the die (e.g. plane 1) is good, the controller may increment a first plane count of the number of bad blocks for that die (e.g. a counter named bb_plane0 or another name). Similarly, if the GBB is in the second plane of the die (e.g. plane 1) while the paired block in the first plane of the die (e.g. plane 0) is good, the controller may increment a second plane count of the number bad blocks for that die (e.g. a counter named bb_plane1 or another name). In contrast, the controller may not increment the first plane count or the second claim count if the blocks in plane 0 and plane 1 are both identified to be GBBs. Thus, the first plane count and the second plane count respectively indicate a number of single plane bad blocks (i.e. bad blocks occurring in the first plane alone or the second plane alone).

After the respective plane count is updated, the controller may then switch the block which was paired with the GBB in the opposite plane (the single plane good block) to the surplus state. For instance, if the GBB was identified in the first plane, the controller may switch the previously paired block in the second plane to the surplus state, and if the GBB was identified in the second plane, the controller may switch the previously paired block in the first plane to the surplus state. Once the GBB is identified, the controller may unform the superblock that contained the GBB, the controller may place the paired good blocks previously in the superblock in the spare pool and the unpaired good blocks in the surplus pool, and the controller may select pairs of erase blocks from the spare pool (one pair from each die) for formation of a new superblock. If multiple GBBs are identified, the controller may select multiple pairs of good blocks from the spare pool to include in the superblock. The controller may then form a new superblock using the selected pairs of good blocks from the spare pool.

Referring now to FIG. 6, the controller may first select the dies for the superblock, request one pair of erase blocks from each die to be included in the superblock, and if the dies include good erase block pairs, the controller may obtain one pair from each die, identify the pairs of good blocks to include in the superblock, and create the new superblock. Then as represented by block 602, the controller may identify the number of erase block pairs in the new superblock. For example, referring to FIGS. 4 and 5, the controller may determine the number of pairs of single plane good blocks 510 or erase blocks 408 in the superblock 412, 504. Moreover, as represented by block 604, the controller may determine whether the scan mode is disabled, and if so, then as represented by block 606, the controller may determine whether the number of erase blocks is equal to the superblock threshold (e.g. the minimum number of erase blocks to form a superblock). For instance, referring to FIGS. 4 and 5, assuming the superblock threshold 506 is 56, then the controller may determine if the number of erase blocks 408 in the newly formed superblock is equal to the minimum of 56. If so, then as represented by block 608, the controller initiates the die sequence formation process by switching the scan mode from "disabled" to "start" so that the controller may scan the dies to identify pairs of single plane good blocks in the surplus state to add to the spare pool (for each die). Otherwise, if the controller determines at block 604 that the scan mode is not disabled, the controller may check whether the scan mode is "in progress" and proceed to scan dies for surplus blocks, as described below with respect to blocks 630 and 632.

Next, as represented by blocks 610 and 612, the controller may identify a list of dies to exclude when forming the die sequence by checking the minimum number of bad blocks between the two planes of each die. For example, the controller may check the first plane count of bad blocks and the second plane count of bad blocks described above, and the controller may identify the smaller count between the first plane count and the second plane count. For instance, if the first plane count for the die includes 2 bad blocks and the second plane count for the same die includes 7 bad blocks, the controller may identify the minimum or smaller value to be 2 (from the first plane count). The controller may repeat the process of identifying the minimum number of bad blocks for all the dies in the superblock. After identifying all the minimums, the controller identifies which dies include a minimum value of 0 (i.e. which dies have 0 bad blocks in either their first plane count or their second plane count), and determines these dies are to be excluded when forming the die sequence. For instance, the controller may include the die number(s) or other identifier in a list of excluded dies. Dies which have a minimum first plane count or second plane count of 0 are dies which include single plane good blocks in the surplus state in only one plane, and thus these dies' surplus blocks may not be used for superblock formation. For example, a die having a first plane count of 0 may only have single plane good blocks in the second plane, while a die having a second plane count of 0 may only have single plane good blocks in the first plane; thus, the controller may determine in either case that no pairs of surplus, single plane good blocks across both planes exist for these dies. Accordingly, these dies may be excluded from the die sequence to save time during the scanning process. Additionally, as represented by block 614, if the controller determines that the number of dies to be excluded is equal to the total number of dies in the superblock (i.e. there are no pairs of surplus, single plane good blocks across both planes for all dies), then none of the dies' surplus blocks may be used for superblock formation. Accordingly, as represented by block 616, the controller may set the scan mode to "stop" and avoid scanning the dies altogether if the number of dies to be excluded equals the total number of dies in the superblock.

If the controller determines at block 614 that less than the total number of dies may be added to the list of excluded dies, if any, then the controller may proceed to identify the die sequence of dies to be scanned for surplus block pairs. First, as represented by block 618, the controller identifies a first die list including a rank of each die in descending order of the minimum number of bad blocks for each die. For instance, dies which have a minimum first plane count or second plane count of 17 may be identified to have a higher rank than dies which have a minimum first plane count or second plane count of 10. The ranking is sorted in descending order since dies with higher minimum bad block plane counts may have a higher number of pairs of surplus blocks that may be identified from those dies. For instance, a die having a minimum plane count of 17 bad blocks would include at least 17 pairs of surplus erase blocks, which is more than a die having a minimum plane count of 10 bad blocks (which would include at least 10 pairs of surplus erase blocks).

Second, as represented by block 620, the controller identifies a second die list including a rank of each die in ascending order of a number of erase blocks in the spare pool. For instance, dies which have a number of spare erase blocks of 2 may be identified to have a higher rank than dies which have a number of spare erase blocks of 20. The ranking is sorted in ascending order since dies with a lower number of spare erase blocks may have experienced more GBBs, and thus a higher likelihood of pairs of single plane good blocks, than dies with a higher number of spare erase blocks. Accordingly, there may be a higher likelihood of forming more erase blocks in each superblock (or more superblocks) from dies with lower numbers of spare erase blocks than from dies with higher numbers of spare erase blocks.

Third, as represented by block 622, the controller identifies a third die list including a rank of each die in ascending order of a count of bad blocks for each die. For instance, dies which have a total number of bad blocks (regardless of plane) of 80 may be identified to have a higher rank than dies which have a total number of bad blocks of 200. The ranking is sorted in ascending order since dies with higher bad block counts may have a higher likelihood of pairs of single plane good blocks, as described above.

Once the controller identifies the first, second, and third die lists, then as represented by block 624, the controller removes any dies from each list that are identified to be in the list of excluded dies described above. Thus, the controller may confirm that all the dies in the three die lists have at least one pair of surplus blocks that may be found. Then, as represented by block 626, the controller identifies a fourth die list from the previous three die lists which indicates the die sequence that the controller may follow when identifying pairs of surplus blocks. The fourth die list may include a rank of each die in ascending order of a weighted average of the first, second, and third die list rankings. For instance, the controller may assign a weightage for each die list, calculate a product of the weightage and the ranking for each die in each die list, add the products together to form a sum of weighted ranks for each die, average the sum of weighted ranks for each die, and then sort the weighted averages in ascending order. For instance, a die which has a weighted average of 1 may be identified to have a higher rank, and thus may be scanned earlier, than a die which has a weighted average of 3.2.

An example of how these weighted averages may be calculated is described as follows, where the controller identifies the following minimum bad block plane counts (or maximum surplus block pairs), spare pool erase block counts, and total bad block count for five dies (identified by a logical die index (LDI)), which are indicated in Table 1. Although this example assumes that the superblock includes pairs of blocks from five dies, the weighted averages may be similarly calculated to identify the die sequence for any number of dies (e.g. 32 dies as illustrated in FIG. 4).

TABLE 1

| LDI Number | LDI0 | LDI1 | LDI2 | LDI3 | LDI4 |
| --- | --- | --- | --- | --- | --- |
| Minimum Single Bad Block Plane Count (or Maximum Surplus Block Pairs) | 10 | 12 | 12 | 17 | 14 |
| Spare Pool Erase Block Count | 10 | 10 | 4 | 2 | 20 |
| Bad Block Count | 90 | 100 | 200 | 80 | 100 |

Accordingly, when the controller identifies the first die ranking as described above with respect to block 618, the controller may rank the minimum single bad block plane counts in descending order as follows in Table 2. Moreover, when the controller identifies the second die ranking as described above with respect to block 620, the controller may rank the spare pool erase block counts in ascending order as follows in Table 3. Similarly, when the controller identifies the third die ranking as described above with respect to block 622, the controller may rank the bad block count in ascending order as follows in Table 4. A summary of the first, second, and third die rankings are shown together as follows in Table 5. The controller may also determine that none of the dies are on the excluded die list, as described above with respect to block 624.

TABLE 2

| First Die List | LDI3 | LDI4 | LDI1 | LDI2 | LDI0 |
| --- | --- | --- | --- | --- | --- |
| Minimum Single Bad Block Plane Count (or Maximum Surplus Block Pairs) | 17 | 14 | 12 | 12 | 10 |
| Ranking ($R_1$) | 1 | 2 | 3 | 3 | 4 |

TABLE 3

| Second Die List | LDI3 | LDI2 | LDI0 | LDI1 | LDI4 |
|---|---|---|---|---|---|
| Spare Pool Erase Block Count | 2 | 4 | 10 | 10 | 20 |
| Ranking ($R_2$) | 1 | 2 | 3 | 3 | 4 |

TABLE 4

| Third Die List | LDI3 | LDI0 | LDI1 | LDI4 | LDI2 |
|---|---|---|---|---|---|
| Bad Block Count | 80 | 90 | 100 | 100 | 200 |
| Ranking ($R_3$) | 1 | 2 | 3 | 3 | 4 |

TABLE 5

| | LDI Number | | | | |
|---|---|---|---|---|---|
| Die List k | LDI0 ($R_k$) | LDI1 ($R_k$) | LDI2 ($R_k$) | LDI3 ($R_k$) | LDI4 ($R_k$) |
| First Die List (k = 1) | 4 | 3 | 3 | 1 | 2 |
| Second Die List (k = 2) | 3 | 3 | 2 | 1 | 4 |
| Third Die List (k = 3) | 2 | 3 | 4 | 1 | 3 |

The controller may then identify the weighted average of the identified first, second, and third die rankings, as described above with respect to block 626. For example, the controller may assign the following weightages for each die list: $w_1=0.3$, $w_2=0.5$ and $w_3=0.2$, where $w_1$ corresponds to the first die list, $w_2$ corresponds to the second die list, and $w_3$ corresponds to the third die list. Alternatively, the controller may assign other weightages whose total sum is equal to 1. Based on the weightages, the controller may calculate the weighted average of each die's rank, as illustrated accordingly in Table 6 below. Afterwards, the controller may identify the die sequence based on a rank of each die's weighted average, as illustrated in Table 7 below.

TABLE 6

| LDI Number/ ($R_k * w_k$) | Given Weightage ($w_k$) | LDI0 ($R_k$) | LDI1 ($R_k$) | LDI2 ($R_k$) | LDI3 ($R_k$) | LDI4 ($R_k$) |
|---|---|---|---|---|---|---|
| First Die List (k = 1) | 0.3 | 4 * 0.3 | 3 * 0.3 | 3 * 0.3 | 1 * 0.3 | 2 * 0.3 |
| Second Die List (k = 2) | 0.5 | 3 * 0.5 | 3 * 0.5 | 2 * 0.5 | 1 * 0.5 | 4 * 0.5 |
| Third Die List (k = 3) | 0.2 | 2 * 0.2 | 3 * 0.2 | 4 * 0.2 | 1 * 0.2 | 3 * 0.2 |
| Sum of Weighted Ranks $\sum_{k=1}^{3} R_k * w_k$ | | 4 * 0.3 + 3 * 0.5 + 2 * 0.2 | 3 * 0.3 + 3 * 0.5 + 3 * 0.2 | 3 * 0.3 + 2 * 0.5 + 4 * 0.2 | 1 * 0.3 + 1 * 0.5 + 1 * 0.2 | 2 * 0.3 + 4 * 0.5 + 3 * 0.2 |
| Final Weighted Average ($\sum_{k=1}^{3} R_k * w_k)/\sum_{k=1}^{3} w_k$ | | 3.1 | 3 | 2.7 | 1 | 3.2 |

TABLE 7

| LDI Number/ ($R_k * w_k$) | LDI3 ($R_k$) | LDI2 ($R_k$) | LDI1 ($R_k$) | LDI0 ($R_k$) | LDI4 ($R_k$) |
|---|---|---|---|---|---|
| Final Weightage $\sum_{k=1}^{3} R_k * w_k$ | 1 | 2.7 | 3 | 3.1 | 3.2 |
| Rank | 1 | 2 | 3 | 4 | 5 |

Thus, in this example, the controller may identify the die sequence to be LDI3, LDI 2, LDI1, LDI0, and LDI4. In other words, the controller first scans the erase blocks of logical die 3 for surplus block pairs, followed by the erase blocks in logical die 2, logical die 1, logical die 0, and then lastly logical die 4.

After identifying the die sequence, then as represented by block 628, the controller may switch the scan mode from "start" to the "in progress" state, and if the controller determines that a new superblock is being formed as represented by block 630 (e.g. in response to an old superblock being un-formed due to a GBB as described above), then as represented by block 632, the controller may proceed to scan each die for pairs of surplus blocks in the order indicated by the die sequence. For instance, after identifying the first die from the die sequence, the controller may read the metadata or header of each erase block to determine whether the block is in the surplus state. If the controller determines that a block in a plane is in the surplus state, the controller may add the erase block to a surplus list independently corresponding to that plane.

After reading the metadata for each erase block in the die (in both planes), then as represented by block 634, the controller pairs erase blocks in the two surplus lists together and adds those pairs of erase blocks to the spare pool. For instance, the controller may change the state of each paired erase block from the surplus state to the unallocated not full or unallocated full state. Once the pairs have all been added to the spare pool for the die, the controller may move to the next die in the die sequence and repeat the above process. The controller may continue accordingly for each die in the die sequence until all dies have been scanned and erase block pairs for each die have been formed, after which, as represented by block 636, the controller may switch the scan mode to "stop".

Afterwards, the erase block pairs in the spare pool may be used for superblock formation. For instance, the controller may associate the erase block pairs to an existing superblock to increase the number of erase blocks in the superblock, or the controller may associate the erase block pairs to additional superblocks to increase the number of superblocks in the storage device (e.g. by changing the metadata of different erase blocks to the allocated not full or allocated full state corresponding to a particular superblock). In this way, surplus erase blocks are not unused, superblocks may continue to be formed, and the storage capacity and life of the storage device may consequently improve.

Figure 7:
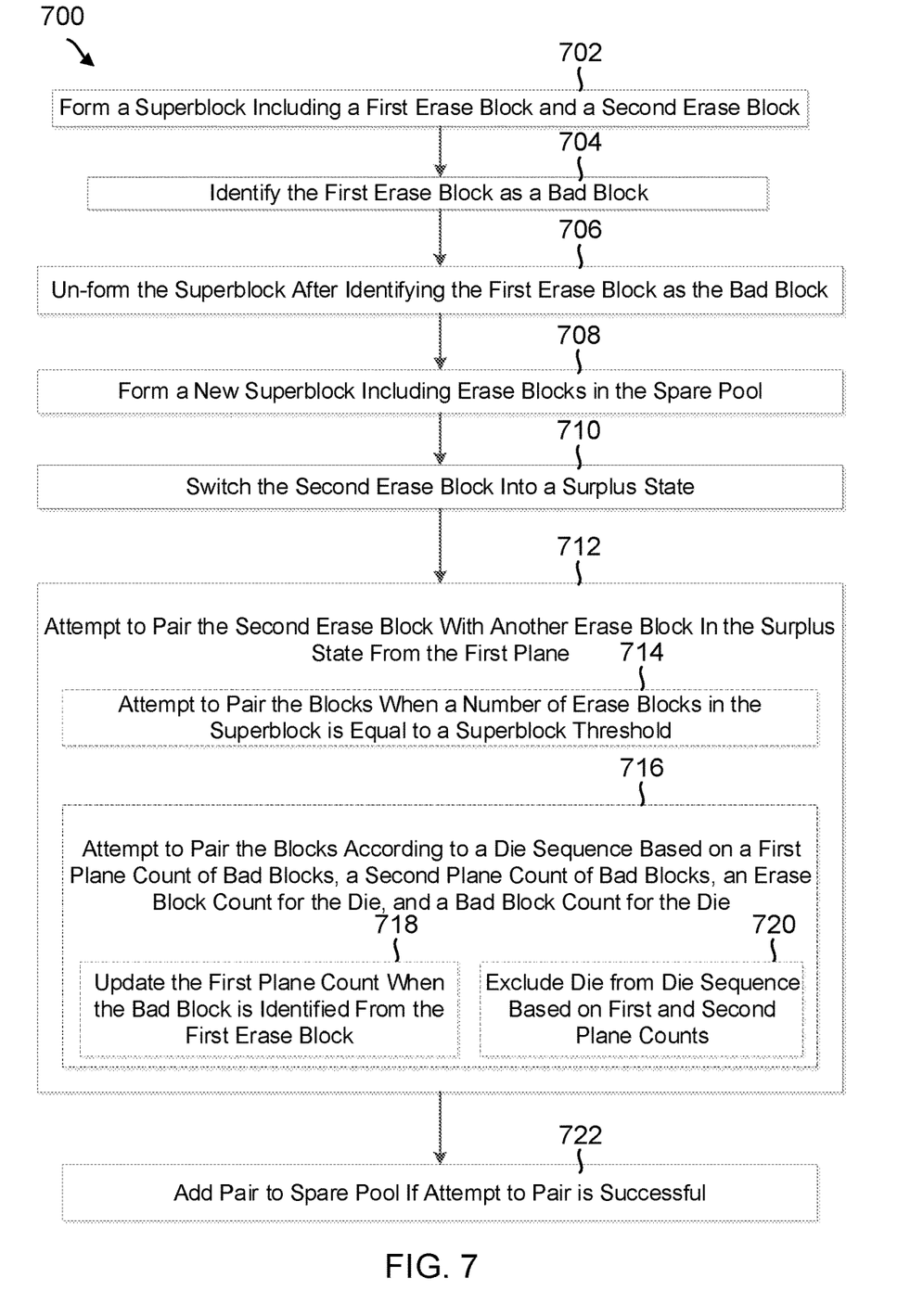
FIG. 7 is a flow chart illustrating another method for pairing surplus blocks to form a superblock, which is performed by the storage device of FIG. 1.

FIG. 7 illustrates an example flow chart 700 of a method for pairing surplus blocks to form a superblock. For example, the method can be carried out in a storage device 102 such as the one illustrated in FIG. 1. Each of the steps in the flow chart can be controlled using the controller as described below (e.g. controller 123, 302), or by some other suitable means. Optional aspects are illustrated in dashed lines.

As represented by block 702, the controller may form a superblock including a first erase block and a second erase block. The first erase block may be included in a first plane of a die, and the second erase block may be included in a second plane of the die. For example, referring to FIGS. 1, 3-5, the controller 123, 302 may form a superblock 412, 504 including pairs 410 of erase blocks 408 from each die 404, where each pair 410 of erase blocks includes a first erase block from one of the planes 406 of a die 404 and a second erase block from another of the planes 406 of the die 404.

As represented by block 704, the controller may identify the first (or second) erase block as a bad block. For example, referring to FIGS. 1, 3-5, the controller 123, 302 may identify one of the erase blocks 408 in the superblock 412, 504 as a bad block 508.

As represented by block 706, the controller may un-form the superblock after identifying the first (or second) erase block as the bad block. For example, referring to FIGS. 1, 3-5, after identifying one of the erase blocks 408 in the superblock 412, 504 as a bad block 508, the controller may un-allocate the different pairs 410 of erase blocks 408 from the superblock 412, 504 which contained the bad block 508. The unallocated pairs 410 of erase blocks may be assigned to a spare pool 414.

As represented by block 708, the controller may form a new superblock including erase blocks from the die in a spare pool after identifying the first (or second) erase block as the bad block. For example, referring to FIGS. 1, 3-5, after identifying one of the erase blocks 408 in the superblock 412, 504 as a bad block 508 and un-forming the superblock 412, 504 accordingly, the controller may form a new superblock 412, 504 by allocating pairs 410 of erase blocks 408 in the spare pool 414 (i.e. one pair 410 from each die 404, with each erase block in the pair being from a different plane 406). The number of erase blocks in the new superblock may be reduced with respect to the previous superblock. For example, if the number of dies in the superblock is 32 (and thus the maximum number of erase blocks that may be included in the superblock is 64), the new superblock may have less than the maximum number of single plane good blocks 510, such as 62 or 60 erase blocks as illustrated in FIG. 5.

As represented by block 710, the controller may switch the second erase block into a surplus state when the first erase block is identified as the bad block. Alternatively, the controller may switch the first erase block into the surplus state when the second erase block is identified as the bad block. For example, referring to FIGS. 1, 3-5, after identifying one of the erase blocks 408 in the superblock 412, 504 as a bad block 508, after un-forming the superblock 412, 504, and during or after forming a new superblock 412, 504, the controller 123, 302 may switch the other erase block 408 in the pair 410 (e.g. the single plane good block 510 opposite the GBB 508 in the corresponding pair 410) to the surplus state 416.

As represented by block 712, the controller may attempt to pair the second erase block with another erase block in the surplus state from the first plane when the first erase block is identified as the bad block. Alternatively, the controller may attempt to pair the first erase block with another erase block in the surplus state from the second plane when the second erase block is identified as the bad block. For example, as represented by block 714, the controller may attempt to pair the second (or first) erase block with the another erase block when a number of erase blocks in the new superblock is equal to a superblock threshold. Moreover, as represented by block 716, the controller may attempt to pair the second (or first) erase block with the another erase block according to a die sequence (including the die and one or more additional dies). For example, referring to FIGS. 1, 3-6, after identifying one of the erase blocks 408 in the superblock 412, 504 as a bad block 508, after un-forming the superblock 412, 504, and during or after forming a new superblock 412, 504, the controller may attempt to pair the single plane good blocks 510 that are in the surplus state 416 with other erase blocks 408 (of the same corresponding die 404 but in the opposite plane 406). The attempt to pairing may occur as described above with respect to FIG. 6. For instance, when the controller determines that the number of erase blocks 408 in the new superblock 412, 504 is equal to the superblock threshold 506, the controller may identify a die sequence to scan the possible dies with pairs of erase blocks in the surplus state. If the controller determines during the die scanning that a block in a plane of a die is in the surplus state, the controller may add the erase block to a surplus list corresponding to that plane. After scanning the die, the controller may pair any erase block in one surplus list (corresponding to one plane) with any erase block in the other surplus list (corresponding to the other plane). These pairs may then be added to the spare pool.

The die sequence may be based on a first plane count including a first number of single plane bad blocks in the first plane and a second plane count including a second number of single plane bad blocks in the second plane. In such case, as represented by block 718, the controller may update the first plane count when the bad block is identified from the first erase block. Alternatively, the controller may update the second plane count when the bad block is identified from the second erase block. The controller may similarly update the first and second plane counts when bad blocks are identified from new superblocks. Moreover, as represented by block 720, the controller may exclude the die from the die sequence based on the first plane count and the second plane count. For example, referring to FIG. 6, the controller may identify the die sequence based on a first die list including die rankings determined based on bad block plane counts, as described above with respect to block 618. The controller may also exclude dies from the die sequence based on the bad block plane counts, as described above with respect to blocks 610, 612, and 624. Moreover, referring to FIGS. 4 and 5, if the controller identifies the bad block 508 from one of the planes 406, the controller may update a plane count corresponding to the respective plane from which the bad block 508 is identified. Thus, if the bad block 508 corresponds to the first erase block in one of the planes 406, the controller may update a first plane count for the die 404, while if the bad block corresponds to the second erase block in the other of the planes 406, the controller may update a second plane count for the die 404. The controller may update plane counts when bad blocks 508 occur in initial superblocks (formed during initialization) or subsequent superblocks (formed after initialization in response to bad blocks).

The die sequence may be also based on an erase block count for the die in the spare pool. For example, referring to FIG. 6, the controller may identify the die sequence based on a second die list including die rankings determined based on spare erase block counts, as described above with respect to block 620.

Furthermore, the die sequence may be based on a bad block count for the die. For example, referring to FIG. 6, the controller may identify the die sequence based on a third die list including die rankings determined based on total bad block counts for the die, as described above with respect to block 622.

If the attempt to pair is successful, then as represented by block 722, the controller may add the pair to the spare pool. Otherwise, if the attempt to pair is not successful, the second erase block is not added to the spare pool. For example, as described above with respect to FIG. 6, if the controller identifies pairs of surplus erase blocks (in different planes) for a die during the die scanning, the controller may add those pairs of erase blocks to the spare pool. For instance, the controller may change the state of each paired erase block from the surplus state to the unallocated not full or unallocated full state. If no pairs of surplus erase blocks are found for a die after the die scanning (i.e. all the surplus erase blocks which the controller found, if any, were in one plane of the die), then the controller may maintain those erase blocks in the surplus state; they are not added to the spare pool.

Accordingly, the storage device described in the present disclosure allows for surplus block pairs to be used for superblock formation, thus increasing the drive capacity of the storage device. The surplus block pairs may be identified during an end of life of the storage device, or when the storage device includes numerous bad blocks which are identified from a single plane of a die. The storage device also allows for surplus block pairs to be identified according to a die sequence which is determined based on the bad blocks in each plane and die and the erase blocks in the spare pool and which excludes dies which do not have any pairs of surplus blocks, thereby providing for efficient surplus block pair scanning.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a die comprising a first plane and a second plane, wherein the first plane includes a first erase block and wherein the second plane includes a second erase block; and
a controller coupled to the die and configured to:
form a superblock including the first erase block and the second erase block,
identify a die sequence to scan the die and one or more additional dies for pairs of erase blocks in a surplus state in an order indicated by the die sequence,
identify the first erase block as a bad block,
switch the second erase block into the surplus state,
attempt to pair the second erase block of the second plane in the surplus state with another erase block of the first plane in the surplus state based on the die sequence to generate a pair of surplus erase blocks from different planes, and
if the attempt to pair is successful, add the pair of surplus erase blocks to a spare pool, wherein the second erase block is not added to the spare pool if the attempt to pair is not successful.

2. The storage device of claim 1, wherein the controller is configured to un-form the superblock after identifying the first erase block as the bad block, to form a new superblock including erase blocks from the die in the spare pool, and to attempt to pair the second erase block with the another erase block when a number of erase blocks in the new superblock is equal to a superblock threshold, wherein the controller is further configured to exclude, in superblocks formed using the spare pool, good blocks in only the first plane or in only the second plane of the die, and to exclude blocks in the surplus state deemed unusable for superblock formation from future pairing attempts.

3. The storage device of claim 1, further comprising the one or more additional dies, wherein the die sequence is based on a first plane count including a first number of single plane bad blocks in the first plane and a second plane count including a second number of single plane bad blocks in the second plane.

4. The storage device of claim 3, wherein the controller is further configured to update the first plane count when the bad block is identified from the first erase block.

5. The storage device of claim 3, wherein the controller is configured to exclude the die from the die sequence based on the first plane count and the second plane count.

6. The storage device of claim 1, further comprising the one or more additional dies, wherein the die sequence is based on an erase block count for the die in the spare pool.

7. The storage device of claim 1, further comprising the one or more additional dies, wherein the die sequence is based on a bad block count for the die.

8. The storage device of claim 1, further comprising the one or more additional dies, wherein the die sequence is based on a first plane count including a first number of single plane bad blocks in the first plane, a second plane count including a second number of single plane bad blocks in the second plane, an erase block count for the die in the spare pool, and a bad block count for the die.

9. A storage device, comprising:
a die comprising a first plane and a second plane, wherein the first plane includes a first erase block and wherein the second plane includes a second erase block; and
a controller configured to form a superblock including the first erase block and the second erase block, to identify a die sequence to scan the die and one or more additional dies for pairs of erase blocks in a surplus state in an order indicated by the die sequence, to identify the second erase block as a bad block, and to form a new superblock including erase blocks from the die in a spare pool after identifying the second erase block as the bad block,
wherein the controller is further configured to switch the first erase block into a surplus state, to attempt to pair the first erase block of the first plane in the surplus state with another erase block of the second plane in the surplus state based on the die sequence to generate a pair of surplus erase blocks from different planes, and if the attempt to pair is successful, to add the pair of surplus erase blocks to the spare pool, wherein the first erase block is not added to the spare pool if the attempt to pair is not successful,
wherein the controller is configured to attempt to pair the first erase block with the another erase block when a number of erase blocks in the new superblock is equal to a superblock threshold,
wherein the controller is further configured to exclude, in superblocks formed using the spare pool, good blocks in only the first plane or in only the second plane of the die, and to exclude blocks in the surplus state deemed unusable for superblock formation from future pairing attempts.

10. The storage device of claim 9, further comprising the one or more additional dies, wherein the die sequence is based on a first plane count including a first number of single plane bad blocks in the first plane and a second plane count including a second number of single plane bad blocks in the second plane.

11. The storage device of claim 10, wherein the controller is further configured to update the second plane count when the bad block is identified from the second erase block.

12. The storage device of claim 10, wherein the controller is configured to exclude the die from the die sequence based on the first plane count and the second plane count.

13. The storage device of claim 9, further comprising the one or more additional dies, wherein the die sequence is based on an erase block count for the die in the spare pool.

14. The storage device of claim 9, further comprising the or more additional dies, wherein the die sequence is based on a bad block count for the die.

15. The storage device of claim 9, further comprising the one or more additional dies, wherein the die sequence is based on a first plane count including a first number of single plane bad blocks in the first plane, a second plane count including a second number of single plane bad blocks in the second plane, an erase block count for the die in the spare pool, and a bad block count for the die.

16. A storage device, comprising:
a die comprising a first plane and a second plane, wherein the first plane includes a first erase block and the second plane includes a second erase block;
one or more additional dies; and
a controller configured to form a superblock including the first erase block and the second erase block, and to identify the second erase block as a bad block;
wherein the controller is further configured to switch the first erase block into a surplus state, to attempt to pair the first erase block of the first plane in the surplus state with another erase block of the second plane in the surplus state to generate a pair of surplus erase blocks from different planes, and if the attempt to pair is successful, to add the pair of surplus erase blocks to a spare pool, wherein the first erase block is not added to the spare pool if the attempt to pair is not successful,
wherein the controller is configured to attempt to pair the first erase block with the another erase block according to a die sequence, wherein the die sequence is based on a first plane count including a first number of single plane bad blocks in the first plane, a second plane count including a second number of single plane bad blocks in the second plane, an erase block count for the die in the spare pool, and a bad block count for the die,
wherein the controller is further configured to exclude, in superblocks formed using the spare pool, good blocks in only the first plane or in only the second plane of the die, and good blocks in only a single plane of each of the one or more additional dies, and to exclude blocks in the surplus state deemed unusable for superblock formation from future pairing attempts.

17. The storage device of claim 16, wherein the controller is configured to form a new superblock including erase blocks from the die and from the one or more additional dies in the spare pool after identifying the second erase block as the bad block, and to attempt to pair the first erase block with the another erase block when a number of erase blocks in the new superblock is equal to a superblock threshold.

18. The storage device of claim 16, wherein the controller is further configured to update the second plane count when the bad block is identified from the second erase block.

19. The storage device of claim 16, wherein the controller is further configured to update one of the first plane count or the second plane count when another bad block is identified from a new superblock.

20. The storage device of claim 16, wherein the controller is configured to exclude the die from the die sequence based on the first plane count and the second plane count.

* * * * *